United States Patent [19]

Gilchrist

[11] 4,009,686

[45] Mar. 1, 1977

[54] BIRD PERCH

[76] Inventor: John E. Gilchrist, 1189 Singletary Ave., San Jose, Calif. 95126

[22] Filed: Sept. 2, 1975

[21] Appl. No.: 609,840

[52] U.S. Cl. .................................................. 119/26
[51] Int. Cl.² ....................................... A01K 31/12
[58] Field of Search ................ 119/18, 72.5, 51.5, 119/51 R, 52 R, 23–26, 72, 77, 51, 52; 248/221, 230, 244, 249, 302, 296

[56] References Cited

UNITED STATES PATENTS

| 2,779,311 | 1/1957 | Hamilton | 119/51 R |
| 3,049,093 | 8/1962 | Oliver | 119/18 |
| 3,504,108 | 3/1970 | Kihs | 248/302 |
| 3,537,428 | 11/1970 | Montgomery | 119/18 |
| 3,589,338 | 6/1971 | Lovitz | 119/72.5 |

*Primary Examiner*—Louis G. Mancene
*Assistant Examiner*—Peter K. Skiff

[57] ABSTRACT

A bird perch to be used in combination with liquid feeders that have a reservoir and a feed tube, which are suspended in an inverted position. The perch is comprised of a continuous wire forming a circular perch member at one end and a support member encompassing a resilient collar at the other end. The resilient collar is slidably received on the feed tube.

2 Claims, 4 Drawing Figures

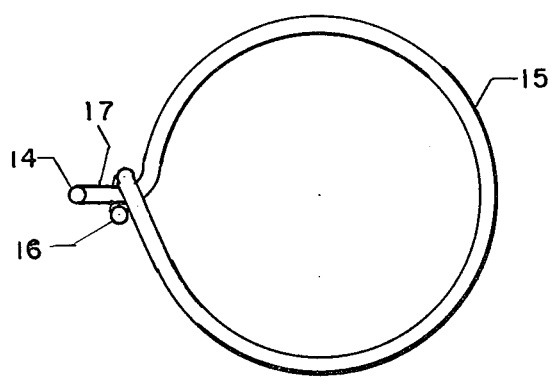
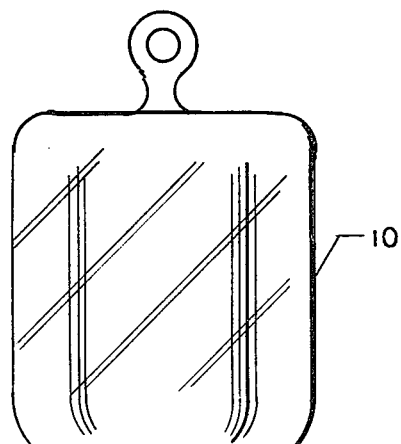
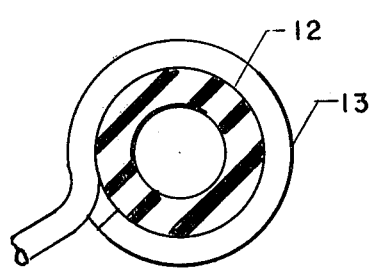
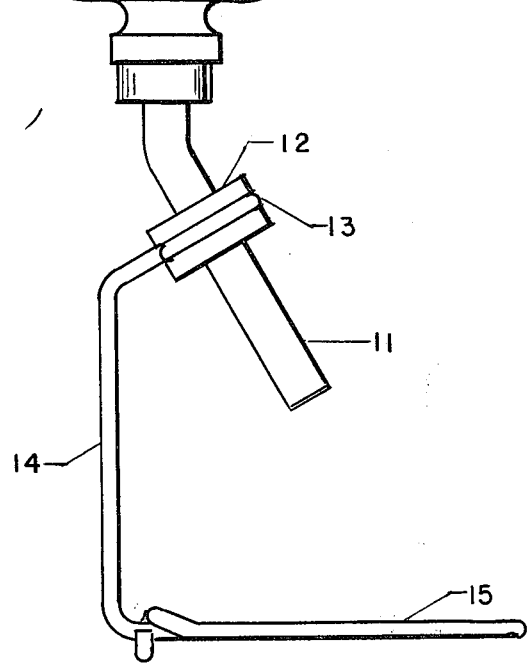
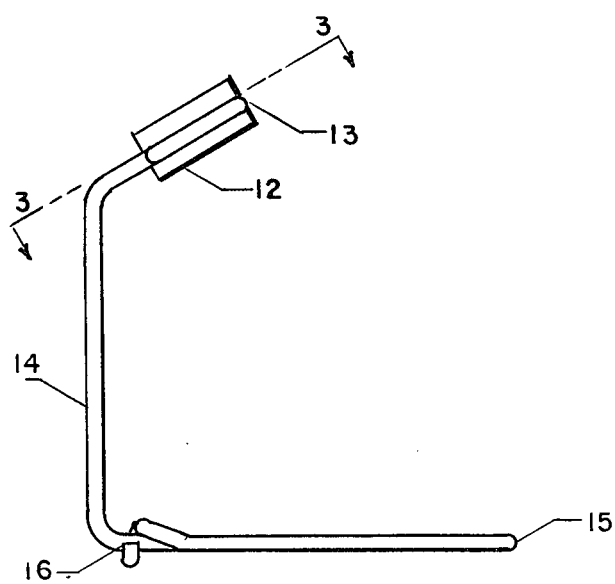

BIRD PERCH

This invention relates to a bird perch, and more particularly concerns a bird perch in combination with present type of bird feeders having a reservoir with a feed tube.

The feeder is inverted and suspended from the bottom end of the reservoir thereby placing the feed tube in a downward position. The sugar water in the reservoir will flow by gravity to the orifice of the feed tube and be accessible to humming birds.

Feeders of this type have no provision for a perch. Humming birds normally feed while hovering, and therefore are not in a static position, furthermore they will intermittently perform gymnastics about the feeder, such as up and down, backward and forward flight. Due to this activity during feeding an observer could not study a humming bird in a static position.

An object of this invention is to provide a perch to be used with feeders having a reservoir with a feed tube which will enable an observer to study a humming bird while in a static position on the perch.

A further object of this invention is simplicity of construction.

A further object of this invention is to provide a quick and easy detachment of the bird perch from the feeder.

A further object of this invention is in having a bird perch that can be located in various positions relative to the feeder thereby giving an observer the advantage of studying a bird in many positions and angles.

A further object of this invention is to provide a perch that is readily adjustable to accommodate chick-a-dees, orioles and other birds that feed on sugar water, and thereby providing an observer with a choice of birds to be observed in a static position.

Other objects and advantages of this invention will further become apparent hereinafter and in the drawings, in which;

FIG. 1 is a side elevation of the bird perch in conjunction with a feeder having a reservoir and a feed tube.

FIG. 2 is a side elevation of the entire bird perch showing the resilient collar and the continuous wire structure.

FIG. 3 is an enlarged auxiliary view shown in section along line 3—3 in FIG. 2.

FIG. 4 is a plan view of the immediate perch portion with the remainder of the bird perch not shown for clarity.

In this drawing FIG. 1 shows pertinent parts 10 and 11 of feeder connected to the bird perch FIG. 2.

The position of the bird perch FIG. 2 relative to feed tube II may be adjusted by moving resilient collar 12 along the length of feed tube II. The bird perch FIG. 2 may be adjusted radially relative to spout II by rotating resilient collar 12.

The bird perch FIG. 2 is held in position by friction between resilient collar 12 and feed tube II.

Resilient collar 12 has an annular groove encompassed bu annular portion 13 of support 14, support 14 continues into 15 by forming a right angle and thereafter forming perch 15 and terminating at 16 by forming around right angle portion 17.

It is to be understood that the form of the invention herewith shown and described is to be taken as a preferred embodiment. Various changes may be made in the size, shape, size and arrangement of parts, such as the use of material of wire, plastic or wood for the bird perch FIG. 2, all without departing from the spirit of the invention as defined in the claims.

What is claimed is:

1. A bird perch in combination with an inverted feeder having a depending feed tube; said bird perch consisting of a resilient collar and a configuration of material defining a perch member and a support member, said support member having means connecting said resilient collar at one end and said perch at the other end, said resilient collar slidably received on said feed tube to permit movement of said perch member with respect to said feeder.

2. The bird perch of claim 1 wherein the resilient collar will preferably have an annular groove in the circumference encompassed by the support member at one end.

* * * * *